July 17, 1956 W. E. DAVIDSON 2,755,158
SUPPORT MEANS FOR A MEAT CONTAINER
Filed Nov. 25, 1953
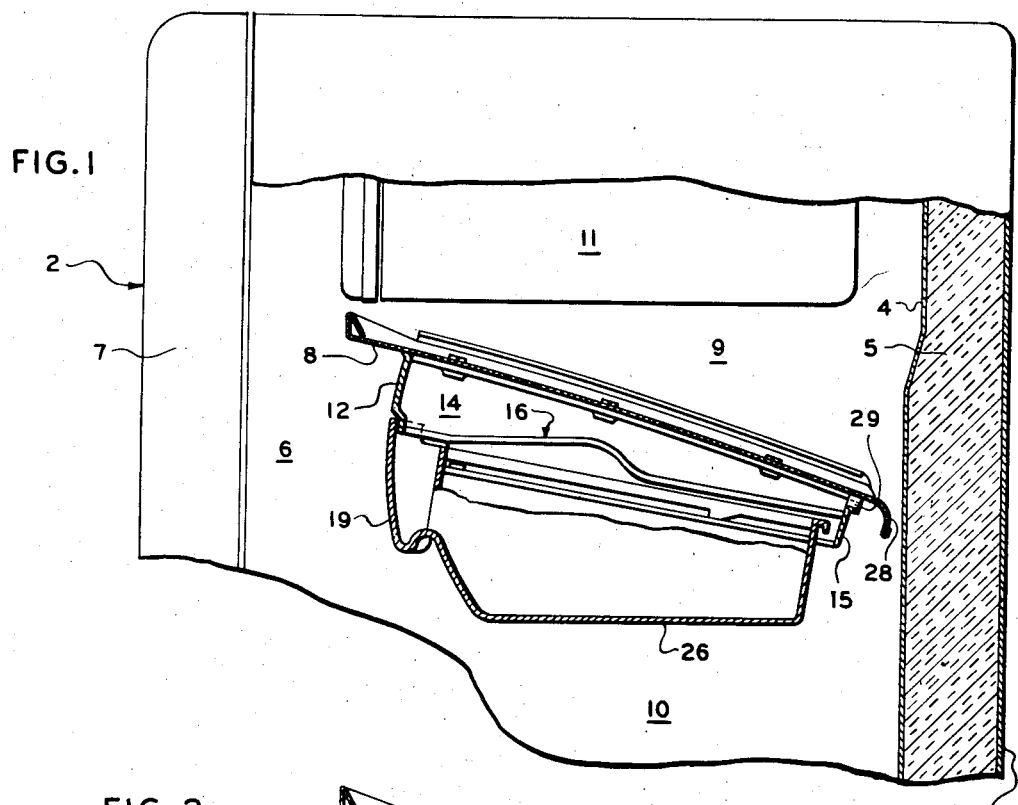
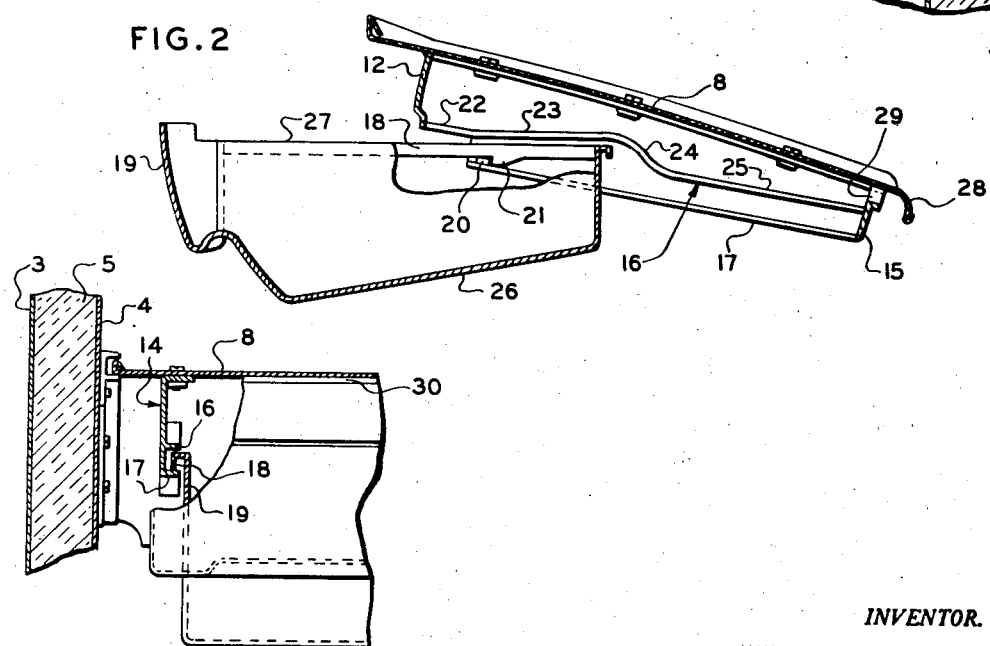
INVENTOR.
WILLIAM E. DAVIDSON
BY
HIS ATTORNEY { # United States Patent Office

2,755,158

Patented July 17, 1956

2,755,158

SUPPORT MEANS FOR A MEAT CONTAINER

William E. Davidson, Cleveland, Ohio, assignor to General Electric Company, a corporation of New York Application November 25, 1953, Serial No. 394,374

1 Claim. (Cl. 312—348)

This invention relates to refrigerator cabinets and, more particularly, to a support means for a meat container that is positioned adjacent the cooling means of the refrigerator cabinet.

Present refrigerators position the container for meat adjacent the cooling means. This, of course, is necessary in order to preserve the meat at a cooler temperature than the remainder of the food storage compartment without freezing the meat as would be the result if it were disposed inside the freezer compartment. However, this arrangement has the disadvantage of the condensation from the cooling means collecting on the meat that is in the container and thus may deprive the meat of some of its flavor. It also results in frost collecting on the meat and this is undesirable.

Another arrangement in present refrigerators includes a cover for the meat container. However, this cover is substantially horizontal so that moisture from the condensation drip does not drain therefrom. As a result, the moisture will overflow into the container or the food storage compartment after a period of time. If the cover is removed before a sufficient amount of moisture has collected thereon to result in overflow, the movement of the cover will tend to cause the collected moisture to spill off the cover into the container or the compartment.

In the present invention, the meat container is positioned adjacent the cooling means but condensation is prevented from collecting on the meat in the container by a sloping baffle disposed between the cooling means and the meat container; this baffle also serves to support the meat container through suitable means. The meat container is still positioned close enough to the cooling means to insure that the meat therein will be preserved. The sloping baffle insures that the moisture will drain therefrom.

The chief object of this invention is to provide a meat container that has its bottom horizontal when positioned completely in its support means and has its top horizontal when the container is in a position from which its contents may be removed but with the container still supported by the support means.

Another object of this invention is to provide a meat container for a refrigerator cabinet that is protected from the condensation drip of the cooling means of the refrigerator cabinet. Other objects of my invention will be readily perceived from the following description.

This invention relates to a refrigerator including a food storage compartment and a baffle disposed in the compartment to divide the compartment into upper and lower portions. Support means are suspended from the baffle and an open container is disposed in the compartment and supported by the support means. Specifically, the support means includes opposed slide members spaced from each other by a stop member that prevents the container from moving beyond the rearmost edge of the support means. Each of the slide members has a guide and a runner. The container is supported by its flanges resting on the runners. The flanges have protrusions that cooperate with lugs on the runners to permit the container to be held in a partially removed position.

The attached drawing illustrates a preferred embodiment of my invention, in which Fig. 1 is an elevational view partly in section of a refrigerator cabinet partly broken away to illustrate the present invention;

Fig. 2 is a view partly in section and partly in elevation showing the container in its partly removed position; and Fig. 3 is a fragmentary enlarged front view partly in section of the support means of the present invention.

Referring to the drawing and particularly Fig. 1, there is shown a refrigerator cabinet 2 having an outer case 3 and an inner liner 4 with a suitable insulation 5 disposed therebetween. The food storage compartment 6 formed by the inner liner 4 has an access opening that is closed by a door 7. A sloping baffle 8 is mounted in the storage compartment 6 to divide the compartment into an upper portion 9 and a lower portion 10. Suitable cooling means 11 such as an evaporator is disposed in the upper portion 9 of the compartment 6.

Secured to the underside of the baffle by suitable means such as bolts and nuts is a support means that includes a pair of slide members 14 that are connected at the front end by a member 12 and at the rear end by a stop member 15. Each of the slide members 14 has a guide 16 extending therefrom and a runner 17 disposed below the guide 16 and substantially parallel thereto. The runner 17 serves as a track on which the flange 18 of a container 19 for meat or the like will ride. Each of the runners 17 is provided with an upwardly extending lug 20 adjacent its front portion. A protrusion 21 extends downwardly from the flange 18 of the container 19 and is located about one-third of the way from the rear edge of the container 19. The purpose of the lugs and the protrusions will be described hereinafter.

As shown in Fig. 2, the guide 16 includes a first downwardly inclined portion 22, a second substantially horizontal portion 23, a curved third portion 24, and a fourth downwardly inclined portion 25. The portions 22 and 25 lie in substantially the same plane and are substantially parallel to the runner 17.

It will be noted that the bottom 26 of container 19 and the top 27 of container 19 are at an angle to each other. When the container 19 is completely inserted in its support means, as shown in Fig. 1, the bottom 26 of container 19 is horizontal. When the container 19 has been removed to the partially removed position, as shown in Fig. 2, it will be seen that the top 27 of the container 19 is horizontal to permit easy removal of the contents of the container 19. The protrusions 21 of the container 19 cooperate with the lugs 20 on the runners 17 to permit the container 19 to be positioned as shown in Fig. 2. It will also be observed that the particular configuration of the guide 16 is necessary in order for the container 19 to assume this position. Thus, the curved portion 24 permits the container to be swung so that its top becomes horizontal and the horizontal portion 23 of the guide 16 permits the top 27 to assume this horizontal position. If it is desired to completely remove the container 19 from the support means for cleaning purposes or other similar reasons, the container need only be lifted slightly in order for the protrusions 21 to clear the lugs 20 to permit complete removal of the container 19 from the support means.

The baffle 8 serves to collect any moisture that condenses off of the evaporator 11. The rear portion of the baffle is provided with a pendent portion 28 that prevents any of the moisture from flowing into the container. This pendent portion directs the moisture towards the inner liner 4. The stop member 15, which serves to connect the slide members 14, also functions to prevent the container 19 from being pushed beyond the pendent portion 28; this insures that no moisture will drain from the baffle 8 into the container 19. The stop member 15 is spaced from the baffle 8 to provide an opening 29 to permit any moisture on the underside of the baffle 8 to flow to the pendent portion 28 rather than dripping into the container 19. In addition, this opening 29 cooperates with an opening 30 provided between member 12 and baffle 8 to permit circulation of air over the contents of the container 19.

This invention has the advantage of permitting the container to be partially removed from its support means to permit ready removal of its contents without completely removing the container from its support means. At the same time, the bottom of the container is horizontal when the container is completely inserted in its support means to permit articles to be easily placed therebeneath on shelves provided for that purpose. It will be observed that if the bottom 26 were parallel to the top 27 of the container 19, articles that could be inserted on a shelf could easily pass the front edge of the container but not the back edge. Thus, this particular design permits complete utilization of the space in the storage compartment. The invention has a further advantage of permitting the container for meat to be positioned adjacent the evaporator without the disadvantage of moisture collecting on the meat to impair its flavor. It will also be noted that positioning the container horizontal in its partially removed position permits short persons to see the contents of the container easier.

While I have shown and described a preferred embodiment of my invention, it will be understood that my invention is not limited thereto but may be embodied within the scope of the following claim.

I claim:

In a refrigerator including a food storage compartment, a rearwardly sloping baffle dividing said compartment into upper and low portions, a container, means for slidably supporting said container beneath said baffle, said supporting means comprising opposed, spaced-apart slide members affixed to said baffle, each of said slide members comprising a rearwardly sloping substantially straight runner and a guide member disposed above said runner in spaced relation therewith, said container including flanges on the side edges thereof fitting between said runners and guide members and supported on said runners, said guide members cooperating with said runners to position said container in said compartment for sliding movement between a forward, partially removed position and a rearward storage position, a lug extending upwardly from each of said runners adjacent the forward end thereof, a protrusion extending downwardly from each of said flanges, for contacting said lugs to position said container in its partially removed position, said guides comprising substantially horizontal front portions overlying the forward end portions of the adjacent runners, downwardly sloping rear portions substantially parallel to adjacent portions of said runners and intermediate curved portions connecting the horizontal front and downwardly sloping rear portions of said guides, the horizontal front portions of said guides including section spaced a greater distance above said runners than the remaining portions of said guides to permit limited forward tilting of the front of said container in said partially removed position.

References Cited in the file of this patent
UNITED STATES PATENTS

| | | |
|---|---|---|
| 888,512 | Kurz | May 26, 1908 |
| 2,242,903 | Crimmel | May 20, 1941 |
| 2,450,305 | Shoemaker | Sept. 28, 1948 |
| 2,496,252 | Norrish et al. | Jan. 31, 1950 |